United States Patent [19]

Juckenack et al.

[11] Patent Number: 5,027,657
[45] Date of Patent: Jul. 2, 1991

[54] ACCELERATION SENSOR WITH CANTILEVERED BENDING BEAM

[75] Inventors: Deitrich Juckenack, Bad Homburg; Matthias Schildwächter, Bad Soden; Klaus-Peter Buege, Moerlenbach; Michael Raab, Wiesbaden; Gerhard Blumenstein, Frankfurt am Main, all of Fed. Rep. of Germany

[73] Assignee: Alfred Teves GmbH, Frankfurt Am Main, Fed. Rep. of Germany

[21] Appl. No.: 445,235

[22] Filed: Dec. 1, 1989

[30] Foreign Application Priority Data

Dec. 9, 1988 [DE] Fed. Rep. of Germany ....... 3841451
Sep. 1, 1989 [DE] Fed. Rep. of Germany ....... 3929082

[51] Int. Cl.$^5$ .............................................. G01P 15/08
[52] U.S. Cl. .............................. 73/517 R; 73/DIG. 3
[58] Field of Search ............... 73/517 R, 651, DIG. 3; 324/207.2, 207.21

[56] References Cited

U.S. PATENT DOCUMENTS

| | | |
|---|---|---|
| 2,552,722 | 5/1951 | King . |
| 2,665,896 | 1/1954 | Kirby et al. . |
| 3,636,774 | 1/1972 | Allison . |
| 4,322,973 | 4/1982 | Iwasaki ............................. 73/517 R |
| 4,448,059 | 5/1984 | Kondo et al. ......................... 73/651 |
| 4,498,341 | 2/1985 | Breitbach et al. ................ 73/517 R |
| 4,825,697 | 5/1989 | Huber ................................ 73/517 R |
| 4,849,655 | 7/1989 | Bennett ............................. 73/517 R |
| 4,870,864 | 10/1989 | Io ..................................... 73/517 R |

FOREIGN PATENT DOCUMENTS

| | | |
|---|---|---|
| 0006636 | 9/1980 | European Pat. Off. . |
| 0251069 | 1/1988 | European Pat. Off. . |
| 0293784 | 12/1988 | European Pat. Off. . |
| 0306178 | 3/1989 | European Pat. Off. . |
| 2225945 | 12/1973 | Fed. Rep. of Germany . |
| 2709156 | 9/1978 | Fed. Rep. of Germany .... 73/517 R |
| 3016001 | 10/1981 | Fed. Rep. of Germany .... 73/517 R |
| 3021317 | 12/1981 | Fed. Rep. of Germany .... 73/517 R |
| 3342186 | 5/1985 | Fed. Rep. of Germany . |
| 58-108422 | 6/1983 | Japan . |
| 745050 | 2/1956 | United Kingdom . |

OTHER PUBLICATIONS

R. F. Gibson et al., "Optimum Damping for Accelerometers," *Instruments and Control Systems*, Sep. 1972, pp. 87–88.

*Primary Examiner*—John E. Chapman
*Attorney, Agent, or Firm*—Robert P. Seitter; J. Gordon Lewis

[57] ABSTRACT

An acceleration sensor essentially consists of a cantilevered laterally bending beam arranged in a housing. Because of its mass inertia the bending beam is deflectable relative to the sensor housing in the plane of the acceleration to be measured. The bending beam has the design of a thin resilient strip which is wide relative to its thickness and is made of amorphous metal. The bending beam may have a one-layer or a multi-layer structure. In case of a multi-layer structure, the friction between the individual strips, causes the vibration to be damped. A small air gap between the walls of a closed housing and the bending beam additionally brings about an air damping of the bending beam's vibrations.

20 Claims, 2 Drawing Sheets

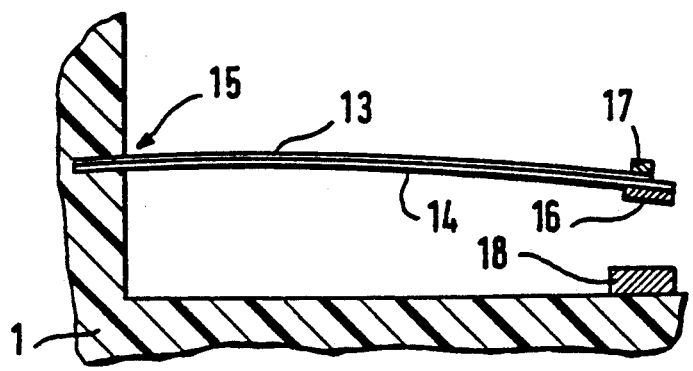
FIG. 4.1
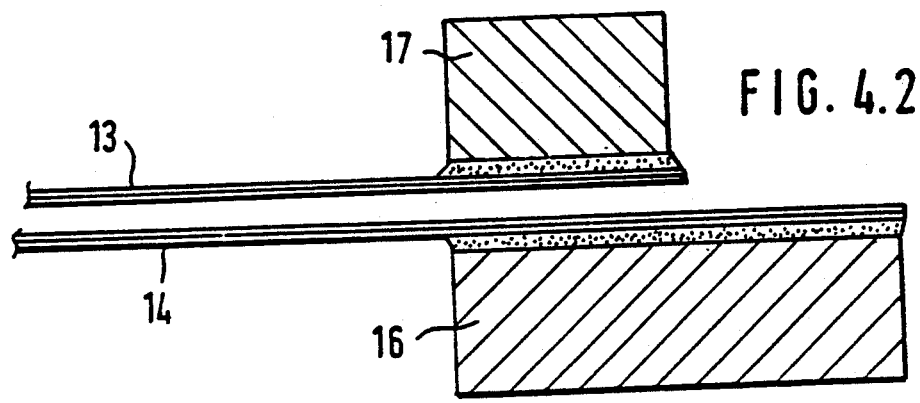
FIG. 4.2
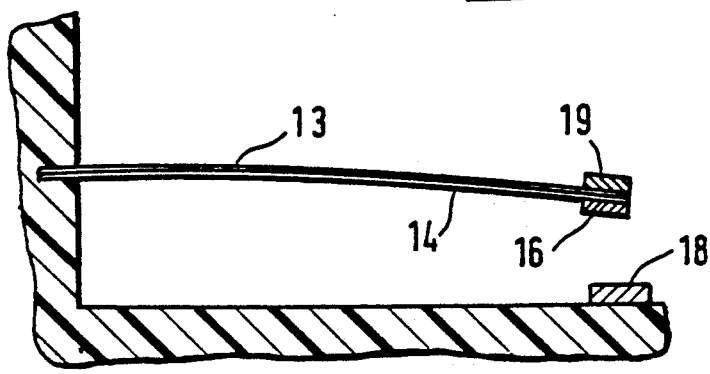
FIG. 5
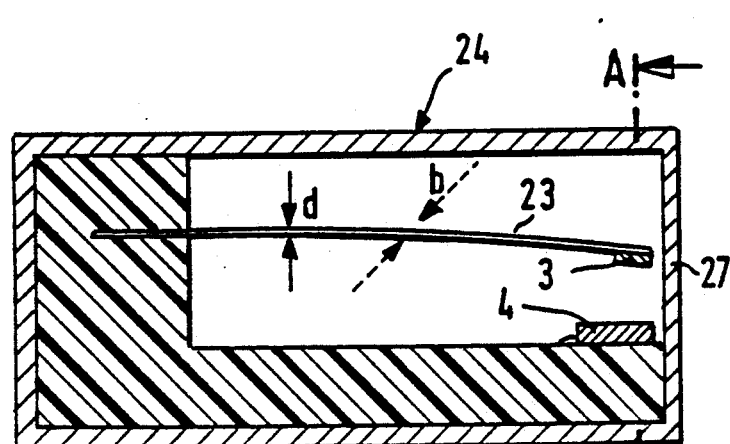
FIG. 7.1
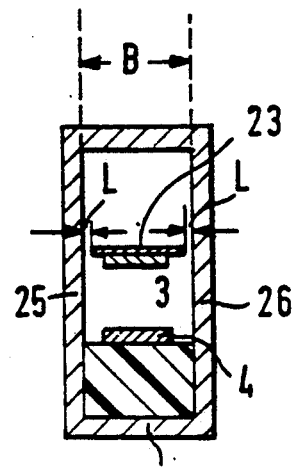
FIG. 7.2

ACCELERATION SENSOR WITH CANTILEVERED BENDING BEAM

BACKGROUND OF THE INVENTION

This invention relates to an acceleration sensor with a cantilevered bending beam, mounted in a housing, with the free end of the bending beam carrying a permanent magnet which functions both as inertial mass and as a signal generator. The beam is deflectable relative to the sensor housing in the plane of the acceleration to be measured. A measuring system for determining the beam deflection in response to an acceleration of the housing includes the permanent magnet(s) as well as one or more magnetic-field-sensitive position sensors (so-called elementary sensors) mounted in the housing, to produce a signal representative of the position or change in position of the permanent magnets.

An acceleration sensor of this general type is described in German Patent Specification (DE) No. 28 29 425 C2. In a closed housing, a seismic mass is mounted on a cantilevered leaf spring unilaterally clamped in the housing. The seismic mass is fixed on the free end of the leaf spring and consists of a moving iron part which, upon deflection, disturbs the magnetic field of a permanent magnet fixed to the housing on the level of the free end. Upon deflection of the mass, an electrical signal is generated by means of two magnetic-field-sensitive ohmic resistors, in particular magnetoresistors, arranged symmetrically to the rest position of the seismic mass and perpendicularly to the field lines of the magnetic field in the air gap between the permanent magnet or the permanent magnet's pole shoes and the seismic mass as well as perpendicularly to the direction of motion of the seismic mass. It is also possible to use a permanent magnet as the seismic mass instead of the moving iron part, in which case the iron parts are fixed to the housing.

A considerable manufacturing effort is required in order to gain a usable measured signal by means of such a device even in case of small accelerations. The forces required to deflect the leaf spring are relatively high which requires the use of a relatively large seismic mass. The selectivity of the deflection in the measuring direction leaves much to be desired. Therefore, such a sensor is not suitable for mass production such as for control engineering applications in automotive vehicles where generally a plurality of like sensors is needed and where the manufacturing price plays a decisive part.

German Patent Specification (DE) No. 31 33 056 C2 also discloses a bending beam sensor. Within a closed housing, there is arranged a bending beam in the form of a unilaterally clamped elastic arm of epoxy resin, vinyl chloride or beryllium copper fixed at one end to the housing. The free end of the elastic arm carries a weight. In the lower part, i.e., near the point where it is fastened to the housing, the elastic arm is surrounded by a coil. In that part of the arm lying within the coil, the arm carries a flat body of an amorphous low-retentivity metal. When the elastic arm is deflected by an acceleration or is caused to vibrate, the deformation will lead to a tensile or compressive load in the low-retentivity body, the load causing a corresponding electric signal at the coil. The signals are electronically transformed into acceleration or deceleration values. The expenditure for such sensors is also very high, particularly if there are demands for a high-degree of measuring accuracy and measuring sensitivity.

Further, a vehicular deceleration measuring device known from Published Patent Application (Offenlegungsschrift) (DE) No. 30 16 001 A1 has a unilaterally clamped leaf spring on the free end of which an inertial mass is mounted with a rod magnet being mounted on the inertial mass. The change of position of the rod magnet is determined by means of a Hall element. A second permanent magnet fastened to the housing is provided in order to tap a voltage at the Hall sensor when the bending beam is deflected, the voltage rising linearly with the deceleration.

SUMMARY OF THE INVENTION

The present invention has the objective of providing a particularly simple-design acceleration sensor, manufacturable at low costs and having a high static and dynamic strength, insensitive to overload, and characterized by a high degree of measuring accuracy and measuring sensitivity in one measuring direction. The rigidity in other transverse directions, on the other hand, ought to be high and thus the transverse strain sensitivity, i.e., the sensitivity to forces transverse to the measuring plane, ought to be low.

It has been found that this object is solvable by means of an acceleration sensor of the type referred to at the beginning, the particular feature of the sensor consisting in that the bending beam takes the form of a thin resilient strip which is wide relative to its thickness and is made of amorphous metal (metallic glass).

According to this invention, an acceleration sensor, meeting high requirements of precision and yet manufacturable at low costs, is obtained by using a one-layer or multi-layer bending beam which, in one direction, reacts with extraordinary sensitivity and accuracy and linearly to accelerations whereas it features a very high bending resistance in the transverse direction. It is possible without any difficulties to achieve a bending resistance in the transverse axis relating to the bending resistance in the working plane at a ratio of 1:4000. The properties will be obtained by means of a thin strip of amorphous metal, with the magnetic properties of the metal playing no part in most of the embodiments of this invention. Because of the sensitivity of the extraordinarily thin strip of amorphous metal it is sufficient to arrange a small permanent magnet as inertial mass and as a signal-causing element on the free end of the bending beam. Upon deflection of the bending beam, this permanent magnet produces an acceleration-representing signal in a sensor arranged in a suitable spot within or on the sensor housing.

According to one advantageous embodiment of this invention, the thickness of the strip-shaped bending beam lies in the range of between 10 and 80 μm, preferably between 20 and 30 μm, and its width in the range of between 1 and 10 mm, preferably between 2 and 4 mm. In this respect, the bending beam's thickness-width ratio is important which ought to lie between 1:50 and 1:1000, preferably between 1:50 and 1:200.

According to another advantageous embodiment of this invention, the bending beam has a multi-layer design and is composed of two or more strips lying parallel and consisting of the amorphous metal and firmly held together on the clamping side in the housing, permanent magnets being arranged on the free surfaces on the free end of the bending beam so that the strips are held together and are pressed onto one another by magnetic force. Expediently, one permanent magnet each is arranged on the free outside surfaces of the multi-layer bending beam or a permanent magnet is arranged on one side, a ferromagnetic iron body being arranged on the other side.

The permanent magnets and the ferromagnetic bodies are preferably glued onto the bending beam.

One side, or rather one surface, of the amorphous-metal strip being rougher than the other, it is expedient to put these sides against each other in order to attain as high a damping action during the relative displacement of the individual strips of the multi-layer bending beam.

Another example of an embodiment of this invention consists in that the bending beam consists of two strips of the amorphous metal which lie parallel and are firmly held together in the clamp and between which, on the free end of said bending beam, a permanent magnet is arranged and glued onto one of the strips while the other strip adheres to the permanent magnet due to the magnet force of attraction. Upon a deflection of the bending beam the displacement of the magnetically adhering strip relative to the permanent magnet will cause the desired vibration damping to be achieved.

In addition to the "friction damping" between the surfaces of the individual strips of the multi-layer bending beam or between the bending beam and the permanent magnet glued to but one strip it is possible, according to this invention, to achieve an "air damping" in that the bending beam is arranged in a closed housing such as to ensure that there remains but a very narrow air gap between the boundaries of the bending beam and the housing walls, the air gap obstructing the exchange of air upon a deflection of the bending beam and thus causing the "air damping" of the bending beam's vibration. It is also conceivable to provide such an air damping exclusively so that such an embodiment is also applicable with multi-layer bending beams.

On the other hand, it is possible to fill the sensor housing with a damping fluid such as silicon oil in a manner known per se in order to dampen the vibration of the bending beam.

The permanent magnets on the bending beam of the invention acceleration sensor expediently takes the form of plates, blocks or the like and are arranged on the free end of the bending beam. Hall elements, magnetoresistors, magnetoresistive sensors or other magnetic-field-sensitive sensors are provided as magnetic-field-sensitive position sensors and are arranged parallel to the bending beam, below or above the bending beam, within the sensor housing. In other embodiments the position sensors are fastened frontally and/or laterally on the sensor housing on the level of the free front side of the bending beam. Finally, it is also possible to arrange the position sensors on the outside walls or outside the sensor housing in the area of the permanent magnet's magnetic field lines vibrating along with the bending beam.

Further characteristics, advantages and applications of this invention will become evident from the following description of examples of embodiments, reference being made to the accompanying drawings.

Therein,

BRIEF DESCRIPTION OF THE DRAWINGS

FIG. 4.1 shows still another acceleration sensor with a multi-layer bending beam;

FIG. 4.2 is the enlarged representation of the free end of the bending beam of FIG. 4.1 with a permanent magnet and a counterpiece;

FIG. 5 is a similar sensor as in FIG. 4.1, however, with two permanent magnets on the free end;

FIG. 7.1 is a sensor with air damping shown in a cross-section parallel to the plane of vibration of the bending beam; and FIG. 7.2 is a cross-sectional view taken along line A—A in FIG. 7.1.

DESCRIPTION OF THE PREFERRED EMBODIMENTS

Figure 1:
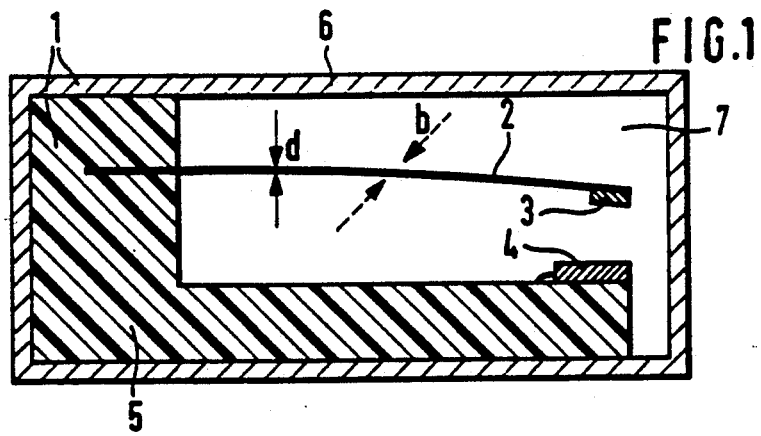
FIG. 1 is a schematically simplified cross-section of an acceleration sensor in accordance with this invention.

As shown in FIG. 1, one form of acceleration sensor according to the invention essentially consists of a housing 1, a bending beam 2 and a measuring system 3, 4 which, on its part, is composed of a signal generator element 3, namely a permanent magnet, and a position sensor or so-called elementary sensor 4. The associated electronics for evaluating the generated signals is not shown for the sake of clarity.

Sensor housing 1 includes a plastic body 5, for holding the unilaterally clamped or cantilevered bending beam 2, and a closed casing 6 enabling the bending beam 2 to be immersed in silicon oil for the purpose of damping the vibration, the oil filling the entire hollow space 7.

The bending beam 2 consists of a thin strip of an amorphous metal which, in one direction, reacts to even very small accelerations—in case of the represented acceleration sensors the direction being the plane of projection—while it has an extraordinarily high bending resistance in the transverse direction, i.e., perpendicularly to the plane of projection. The strip thickness d being approximately 30 $\mu$m and the width b (perpendicular to the plane of projection) being 3 mm, it is possible, for instance, to achieve a ratio of bending resistance around the axis of flexibility (lateral axis) to the bending resistance around the axis of rigidity (vertical axis) of 1:4000. Moreover, the mathematical estimate of the so-called bending beam's danger of tilting (instability problem) for vibration in the direction of the axis of rigidity (vertical axis) provides a sufficient width b with respect to the excitations to be expected in the transverse direction due to disturbances to resist bending in the transverse direction.

The bending beam 2 is fixedly embedded at one end, in the plastic body 5, while its other end is free to vibrate freely. The permanent magnet 3 constitutes an inert mass and acts as a signal generator on this free end, e.g., by being glued thereto. If the amorphous metal out of which the beam 2 is made is magnetic the permanent magnet 3 will adhere to the bending beam 2 by its magnetic force of attraction.

The deflection of the bending beam 2 and in particular of the permanent magnet 3 on the free end of the bending beam can be measured and transformed into a corresponding electric signal by means of a position sensor 4 representing a Hall effect sensor element or containing a magneto-resistive resistor.

Figure 2:
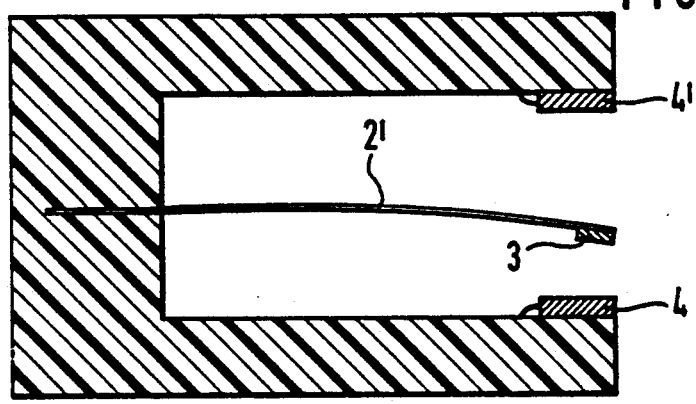
FIG. 2 shows a second embodiment of an acceleration sensor, namely with opposite position sensors.

FIG. 2 shows another embodiment of this invention where the bending beam's 2' free end loaded with the permanent magnet 3 can vibrate between two position sensors 4, 4'. Consequently, in both position sensors 4, 4' the signal will change in opposite directions upon a deflection of the bending beam 2'. This considerably simplifies the evaluation of the signals, or rather the differentiation into interfering and useful signals, and increases the operational reliability of the acceleration sensor (redundancy). As for the rest, there is no fundamental difference from the acceleration sensor as per FIG. 1.

Figure 3:
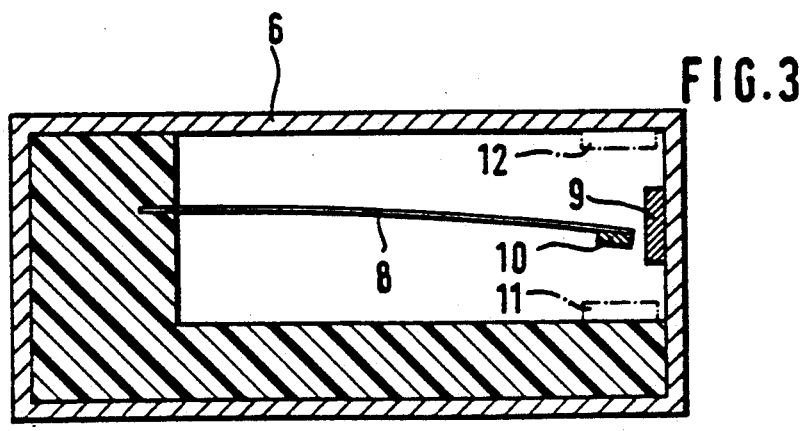
FIG. 3 shows another form of acceleration sensor with a frontally arranged position sensor.

A position sensor 9 is arranged on the front side of the free end of a bending beam 8 in the example of an embodiment of this invention as per FIG. 3. The change in position of the permanent magnet 10 on the free end of the bending beam 8 as a result of an acceleration also leads to an evaluatable signal in the position sensor 9 arranged on the front side.

It is also possible to provide further position sensors 11, 12 in addition to the frontal position sensor 9, the position sensors 11, 12 being arranged below and/or above in the direction of vibration, in order to improve the signal resolution. The sensors 11, 12 have been illustrated by broken lines in FIG. 3 as the additional sensors are superfluous for some applications.

Further, in many cases it is advantageous to arrange the position sensors on the outside or outside the casing 6 of the sensor housing 1 if it is ensured that the changes in the magnetic field in case of a change in position of the permanent magnets 3, 10 are measurable outside the sensor housing.

A multi-layer bending beam consisting of two or of a plurality of strips 13, 14 lying parallel and made of the amorphous metal is provided in the example of an embodiment of this invention as per FIG. 4.1. FIG. 4.2 shows the free end of the bending beam 13, 14 on an enlarged scale and drawn apart.

By means of such an arrangement a "friction damping" of the vibrations will be achieved. The strips 13, 14, lying parallel, namely are embedded together and firmly clamped in the plastic body 5 on the clamping side 15. On the free end of the bending beam 13, 14 the two strips 13, 14 are held together and pressed together by magnetic force. To this end, a permanent magnet 16 is placed and glued onto one of the free surfaces. The permanent magnet magnetically attracts a counterpiece, namely a ferromagnetic body 17 glued onto the other, opposite, free surface on the free end of the bending beam 13, 14. Upon deflection of the bending beam 13, 14, therefore, the two strips 13, 14 lying on top of each other are displaced relative to each other whereby the desired friction damping is brought about.

Each of the individual strips 13, 14 having sides of different roughness, it is expedient to place the rough sides against each other in order to enhance the damping action, the rough sides often having a mat appearance in contrast to the bright appearance of the second surface. As far as it is realizable at reasonable expense it also might be expedient to roughen the tapes' 13, 14 surfaces lying on top of each other.

In this embodiment, an elementary sensor 18 again is arranged on but one side of the bending beam. However, it is also possible to use the alternatives described with reference to FIG. 3.

FIG. 5 differs from the example of an embodiment as per FIG. 4.1 only in that a second permanent magnet 19 is provided as a counterpiece instead of a ferromagnetic body (17). Of course, the two permanent magnets 16, 19 are arranged so as to attract each other.

Figure 6:
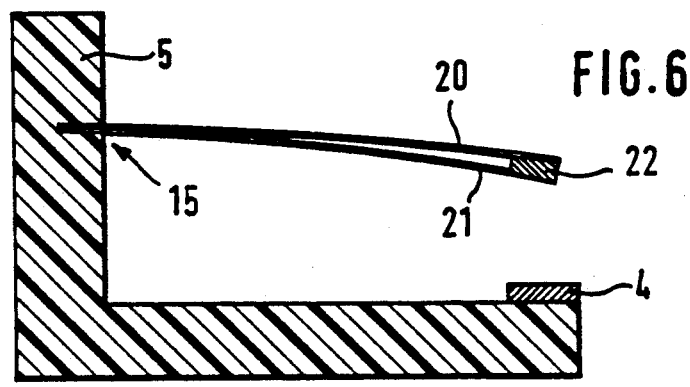
FIG. 6 is a two-layer bending beam where the permanent magnet is arranged between the layers.

In accordance with FIG. 6, the bending beam again consists of two amorphous-metal strips 20, 21 embedded together in the plastic body 5. In this case, however, a permanent magnet 22 is arranged on the free end of the bending beam 20, 21 between the two strips 20, 21. The permanent magnet 22 is glued fast to one of the two strips while it adheres to the other strip by means of magnetic force of attraction. The desired vibration damping in this case also is brought about by friction, namely by the friction between the permanent magnet 22 and the magnetically adhering strip which displaces itself on the permanent magnet body 22 upon deflection of the bending beam 20, 21.

Further variants and shapes are possible in order to achieve a friction damping.

FIGS. 7.1 and 7.2 show two different views of an acceleration sensor where an "air damping" of the vibrations is exclusively or additionally achieved. As regards the cross-section of FIG. 7.1 the sensor is similar to the embodiment already described with reference to FIG. 1. As shown in FIG. 7.2, however, in this case the bending beam 23 is arranged in a housing 24 whose inside space, in particular the latter's width B, is coordinated with the width b of the bending beam 23 so that, in the stationary condition and in case of a deflection of the bending beam 23 as a result of an acceleration, there remains but a very narrow air gap L between the walls 25, 26 and 27, i.e., between the side walls 25, 26 and the front wall 27. The air gap L is rated so that the bending beam 23 does all but touch the walls when it is deflected. On the other hand, the air gap L is to be so small that, upon the deflection of the bending beam within this closed housing 24, the air displacement through the air gap is throttled, thereby the vibration being damped. By adjusting the air gap it is possible to adjust the desired damping action to the desired value.

If necessary, it is possible to combine the described friction damping and air damping in order to achieve the desired damping characteristic of the acceleration sensor in an easy manner.

While certain embodiments of the invention have been described in detail above, it will be apparent to those skilled in the art that the disclosed embodiment may be modified. Therefore, the foregoing description is to be considered exemplary rather than limiting, and the true scope of the invention is that defined in the following claims.

What is claimed is:

1. In an acceleration sensor including a cantilevered bending beam, mounted in a housing, at least one permanent magnet being arranged as inertial mass and as a signal generator on the free end of said bending beam, said bending beam being deflectable relative to the sensor housing in the plane of the acceleration to be measured, a measuring system for determining the deflection, said system consisting of the permanent magnet as well as at least one magnetic-field-sensitive position sensor mounted on the housing; the improvement wherein the bending beam is a thin resilient strip which is wide relative to its thickness and is made of an amorphous metal.

2. An acceleration sensor as claimed in claim 1, wherein the thickness of the bending beam lies in the range of between 10 and 80 $\mu m$, and its width lies in the range of between 1 and 10 mm.

3. An acceleration sensor as claimed in claim 1 wherein the ratio of the bending beam's thickness to the bending beam's width lies between 1:50 and 1:1000.

4. An acceleration sensor as claimed in claim 1, wherein the bending beam comprises a plurality of parallel strips of said amorphous metal firmly held together at one end in the housing, and permanent magnet means on said strips mounted on the free end of the bending beam for magnetically urging said strips toward each other.

5. An acceleration sensor as claimed in claim 4, wherein said permanent magnet means comprises a permanent magnet on one side of said beam and a ferromagnetic body on the other side of said beam.

6. An acceleration sensor as claimed in claim 4, wherein said permanent magnet means comprises a permanent magnet on each of the free outside surfaces of the multi-layer bending beam.

7. An acceleration sensor as claimed in claim 4, wherein said permanent magnet means is adhesively secured to said beam.

8. An acceleration sensor as claimed in claim 4, wherein at least one surface of each strip is rough and the rough surfaces of said strips are in face-to-face engagement with each other.

9. An acceleration sensor as claimed in claim 1, wherein the bending beam consists of two strips of said amorphous metal clamped together at said housing, and permanent magnet means mounted between the free ends of said strips for magnetically urging said strips toward each other.

10. An acceleration sensor as claimed in claim 9, wherein said permanent magnet means comprises a permanent magnet adhesively secured to one of said strips and magnetically adhered to the other of said strips.

11. An acceleration sensor as claimed in claim 1, wherein the bending beam is mounted in a closed housing with a very narrow air gap between the edges of the bending beam and the inner housing walls, said air gap throttling the air flow upon the deflection of the bending beam and thus causing the vibration of the bending beam to be damped.

12. An acceleration sensor as claimed in claim 1, wherein said housing is filled with a damping fluid for the purposes of damping the vibrations of the bending beam.

13. An acceleration sensor as claimed in claim 1, wherein magnetic-field-sensitive position sensors are located parallel to the bending beam within the sensor housing.

14. An acceleration sensor as claimed in claim 1, wherein at least one position sensor is located in the sensor housing on the level of the free end of the bending beam.

15. An acceleration sensor as claimed in claim 1, wherein position sensors are located on the outside walls of said housing in the area of the magnetic field lines of said permanent magnet.

16. An acceleration sensor as claimed in claim 1, wherein the amorphous metal is metallic glass.

17. An acceleration sensor as claimed in claim 1, wherein the thickness of the bending beam lies in the range of between 20 to 30 $\mu$m.

18. An acceleration sensor as claimed in claim 1, wherein the width of the bending beam lies in the range of between 2 and 4 mm.

19. An acceleration sensor as claimed in claim 1, wherein the thickness of the bending beam lies in the range of between 20 to 30 $\mu$m and the width of the bending beam lies in the range of between 2 and 4 mm.

20. An acceleration sensor as claimed in claim 1, wherein the ratio of thickness to width of the bending beam lies between 1:50 and 1:200.

* * * * *